No. 677,073. Patented June 25, 1901.
P. G. FOGELSTROM.
WHEEL SCRAPER.
(Application filed Mar. 8, 1901.)
(No Model.)
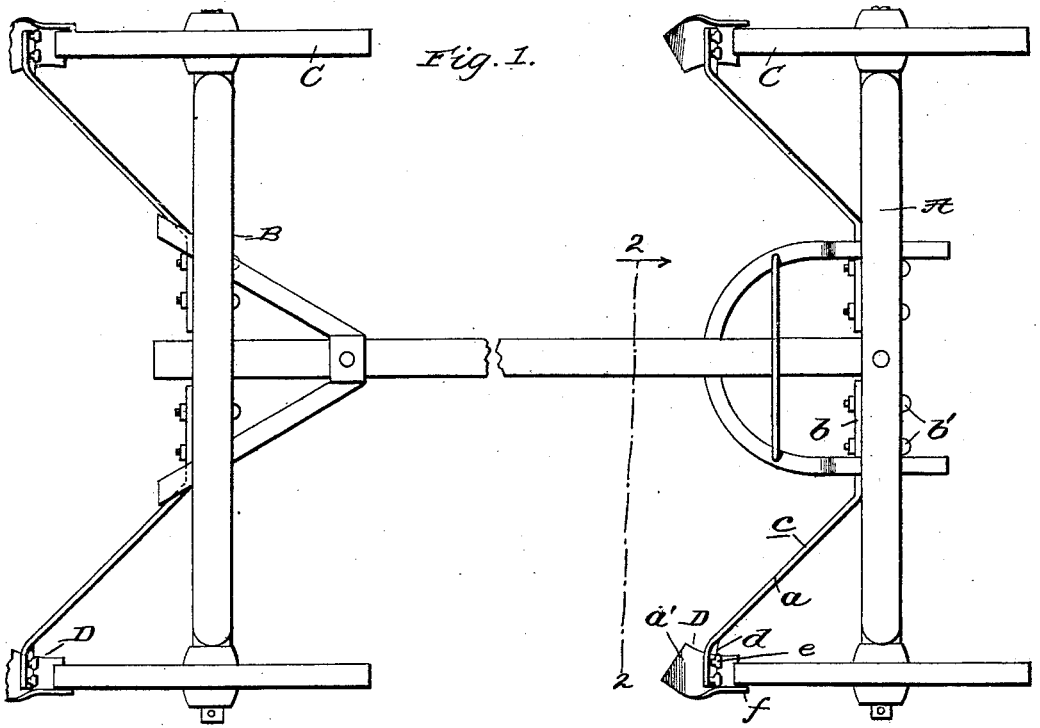
Witnesses:
Inventor
Peter G. Fogelstrom
By James J. Shehy
Attorney

UNITED STATES PATENT OFFICE.

PETER G. FOGELSTROM, OF BRAINERD, MINNESOTA, ASSIGNOR OF ONE-HALF TO JULIUS C. JAMIESON AND FREDERICK A. FARRAR, OF SAME PLACE.

WHEEL-SCRAPER.

SPECIFICATION forming part of Letters Patent No. 677,073, dated June 25, 1901.

Application filed March 8, 1901. Serial No. 50,310. (No model.)

*To all whom it may concern:*

Be it known that I, PETER G. FOGELSTROM, a citizen of the United States, residing at Brainerd, in the county of Crow Wing and State of Minnesota, have invented new and useful Improvements in Wheel-Scrapers, of which the following is a specification.

My invention relates to improvements in vehicle-wheel scrapers and contemplates the provision of devices which, in addition to removing mud and dirt from the tires and fellies of vehicle-wheels, are calculated to deflect such mud and dirt toward the longitudinal center of the roadway, so that the same will fall between instead of in the wheel-tracks of the roadway, and hence will not be liable to be again taken up by the wheels of other vehicles.

With the foregoing in mind my invention will be fully understood from the following description and claims when taken in connection with the accompanying drawings, in which—

Figure 1 is a plan view illustrating the running-gear of a vehicle equipped with my improved devices. Fig. 2 is a detail transverse section taken in the plane indicated by the broken line 2 2 of Fig. 1 looking in the direction of the arrow. Fig. 3 is a detail side elevation illustrating the arrangement of one of the devices with respect to one of the front wheels and the front axle of the vehicle. Fig. 4 is a perspective view of one of the devices removed from the vehicle.

In the said drawings similar letters of reference designate corresponding parts in all of the several views, referring to which—

A B are the front and rear axles of a vehicle running-gear, which may be and preferably are of the ordinary construction and are connected together in the usual or in any other approved manner.

C C are wheels mounted on the axles, and D D are my improved devices for removing mud and dirt from the tires and fellies of the wheels and deflecting the same toward the longitudinal center of the roadway. These devices are similar in construction, and therefore a detailed description of the one shown in Fig. 4 will suffice to impart an understanding of all. The said device preferably comprises an arm $a$, of wrought-iron or other suitable metal, and a plate $a'$, preferably of steel. The arm $a$ has an inner slotted portion $b$, designed to be arranged flat against the rear side of one of the axles A and adjustably connected thereto by bolts $b'$, an intermediate portion $c$, which extends outwardly and rearwardly from the inner portion $b$, and an outer portion $d$, designed to rest parallel to the axle and in rear of one of the wheels thereon. The plate $a'$ is disposed in rear of and connected to the outer portion $d$ of the arm $a$, preferably in a detachable manner, through the medium of thumb-screws $e$, which take through threaded apertures in the arm portion $b$ and into the plate. Said plate $a'$ is generally inclined rearwardly, as best shown in Fig. 3, and its lower edge or end is arranged closely adjacent to the tire of the vehicle-wheel, while on the outer edge of its portion below the arm portion $d$ it has a flange $f$, designed to rest close to the outer side of the wheel-felly. The upper portion of the plate—that is to say, the portion above the arm portion $d$—is curved rearwardly and inwardly, as indicated by $g$, so that its outer rear corner rests in a horizontal plane considerably below that of its inner rear corner, for a purpose presently pointed out.

In applying my improved devices to a vehicle the arms thereof are connected to the rear sides of the vehicle-axles through the medium of the bolts $b'$ and are adjusted so that the lower ends of the plates $a'$ rest closely adjacent to the wheel-tires and the flanges $f$ closely adjacent to the outer sides of the wheel-fellies. By virtue of this arrangement it will be observed that the plates $a'$ will effectually remove mud and dirt from the tires and fellies of the wheels, and consequently prevent the wheels from throwing such mud and dirt upwardly; also, that the mud and dirt so removed will be deflected by the curved upper portions $g$ of plates $a'$ toward the longitudinal center of the roadway and caused to fall between instead of in the wheel-tracks of said roadway. This is obviously an important advantage, since it removes the liability of such mud and dirt being again taken up by vehicle-wheels and at the same time tends to improve the wheel-tracks of the roadway.

It will be readily appreciated from the foregoing that my improved devices are readily attachable to vehicles at present in use as well as to new vehicles, and also that they are adapted to be adjusted so as to rest in proper relation to vehicle-wheels arranged at various distances apart.

When it is desired to remove dust from vehicle-wheels, the plates $a'$ may be removed from the arms $a$ and plates having steel brushes at their lower ends substituted therefor. With the exception of the steel brushes the latter plates are similar in construction to the plates $a'$ and are adapted to operate in the same manner—that is to say, they are calculated to deflect the dust removed from the vehicle-wheel inwardly toward the longitudinal center of the roadway.

I have entered into a detail description of the construction and relative arrangement of parts embraced in the present embodiment of my invention in order to impart a full, clear, and exact understanding of the same. I do not desire, however, to be understood as confining myself to such specific construction and arrangement of parts, as such changes or modifications may be made in practice as fairly fall within the scope of my invention.

Having described my invention, what I claim, and desire to secure by Letters Patent, is—

1. The combination with the running-gear of a vehicle; of a dirt-removing device comprising a plate disposed in rear of one of the wheels of the vehicle, and means connecting the plate to the vehicle; the said plate having its lower end arranged adjacent to the tire of the vehicle-wheel, and being generally inclined upwardly and rearwardly from the same and being provided with the upper portion curved rearwardly and inwardly so that its outer rear corner rests in a horizontal plane below that of its inner rear corner, whereby it is adapted to deflect the dirt removed from the tire of the vehicle-wheel toward the longitudinal center of a roadway, substantially as specified.

2. The combination with the running-gear of a vehicle; of devices comprising arms having portions arranged parallel to the axles of the running-gear and provided with longitudinal slots, and portions extending rearwardly and outwardly from the first-named portions, and plates carried by said arms and disposed in rear of the wheels of the vehicle; said plates having their lower ends arranged adjacent to the tires of the vehicle-wheels, and being generally inclined upwardly and rearwardly from the same, and provided with the upper portions curved rearwardly and inwardly so that their outer rear corners rest in a horizontal plane below that of their inner rear corners, whereby they are adapted to deflect the dirt removed from the tires of the wheels toward the longitudinal center of a roadway, and bolts extending through the slots in the arms of the devices and connecting said arms to the axles of the running-gear, substantially as specified.

In testimony whereof I have hereunto set my hand in presence of two subscribing witnesses.

PETER G. FOGELSTROM.

Witnesses:
E. VON ESCHEN,
A. X. MCCARTHY.